United States Patent

Ray et al.

[11] Patent Number: 6,059,857
[45] Date of Patent: May 9, 2000

[54] ULTRAPURIFICATION OF ORGANIC SOLVENTS

[75] Inventors: Roderick J. Ray; David D. Newbold; Dwayne T. Friesen; Scott B. McCray; Lori A. Ray, all of Bend, Oreg.

[73] Assignee: Bend Research, Inc., Bend, Oreg.

[21] Appl. No.: 09/199,993

[22] Filed: Nov. 24, 1998

Related U.S. Application Data

[63] Continuation-in-part of application No. 08/910,409, Aug. 13, 1997, Pat. No. 5,843,209
[60] Provisional application No. 60/024,126, Aug. 14, 1996.

[51] Int. Cl.[7] .......................... B01D 53/22; B01D 53/04; B01D 53/26
[52] U.S. Cl. ................... 95/52; 95/118; 210/638; 210/669; 210/685; 210/767
[58] Field of Search ................... 95/45, 47–55, 95/117–119; 210/638, 650, 660, 663, 669, 683, 685, 692, 767

[56] References Cited

U.S. PATENT DOCUMENTS

| | | | |
|---|---|---|---|
| 2,792,344 | 5/1957 | Tidwell . | |
| 3,505,005 | 4/1970 | Gilbert . | |
| 3,735,558 | 5/1973 | Skarstrom et al. | 95/51 |
| 3,735,559 | 5/1973 | Salemme | 95/53 |
| 4,136,021 | 1/1979 | Whitehurst . | |
| 4,187,120 | 2/1980 | Kunin et al. | 127/46 A |
| 4,430,226 | 2/1984 | Hegde et al. | 210/638 |
| 4,844,719 | 7/1989 | Toyomoto et al. | 95/58 |
| 4,857,081 | 8/1989 | Taylor | 95/52 |
| 4,952,219 | 8/1990 | DiMartino, Sr. | 95/51 |
| 4,961,759 | 10/1990 | Taylor | 95/52 |
| 4,978,430 | 12/1990 | Nakagawa et al. | 203/14 |
| 5,002,590 | 3/1991 | Friesen et al. | 95/52 |
| 5,004,482 | 4/1991 | Haas et al. | 95/52 |
| 5,034,025 | 7/1991 | Overmann, III | 55/16 |
| 5,067,971 | 11/1991 | Bikson et al. | 95/52 |
| 5,084,073 | 1/1992 | Prasad | 95/52 |
| 5,108,464 | 4/1992 | Friesen et al. | 55/16 |
| 5,116,396 | 5/1992 | Prasad et al. | 95/51 X |
| 5,169,412 | 12/1992 | Prasad et al. | 95/54 X |
| 5,205,842 | 4/1993 | Prasad | 95/47 |
| 5,226,932 | 7/1993 | Prasad | 55/16 |
| 5,236,474 | 8/1993 | Schofield et al. | 95/47 |
| 5,310,486 | 5/1994 | Green et al. | 210/638 |
| 5,332,424 | 7/1994 | Rao et al. | 95/47 |
| 5,354,547 | 10/1994 | Rao et al. | 95/50 X |
| 5,435,836 | 7/1995 | Anand et al. | 95/50 X |
| 5,455,016 | 10/1995 | Choe et al. | 95/47 X |
| 5,507,856 | 4/1996 | Rao et al. | 95/50 |
| 5,518,628 | 5/1996 | Carey | 210/686 |
| 5,611,842 | 3/1997 | Friesen et al. | 95/45 X |
| 5,837,106 | 11/1998 | Ng et al. | 210/669 X |
| 5,843,209 | 12/1998 | Ray et al. | 95/52 |

FOREIGN PATENT DOCUMENTS

| | | | |
|---|---|---|---|
| 0430304 | 6/1991 | European Pat. Off. | 95/52 |
| 3-143523 | 6/1991 | Japan | 95/52 |

*Primary Examiner*—Robert H. Spitzer
*Attorney, Agent, or Firm*—Chernoff, Vilhauer, McClung & Stenzel, LLP

[57] ABSTRACT

A system for the ultrapurification of organic solvents comprising (1) a membrane-based vapor permeation step for selective removal of water vapor from the solvent, wherein a countercurrent sweep stream is used that has a particular partial pressure of water vapor, (2) a filtration step for selective removal of particulates, and (3) an ion exchange step for selective removal of ionic species.

19 Claims, 5 Drawing Sheets

ULTRAPURIFICATION OF ORGANIC SOLVENTS

This is a continuation-in-part of application Ser. No. 08/910,409 filed Aug. 13, 1997, issued as U.S. Pat. No. 5,843,209, and Prov. Application 60/024,126, filed Aug. 14, 1996.

BACKGROUND OF THE INVENTION

Vapor permeation is a membrane-based process that can be used to separate mixtures of vapors. In an example of such a process, a vaporous mixture of Vapor A and Vapor B is fed to the feed side of a membrane, while a vacuum pump or gaseous sweep stream, usually in combination with a condenser, maintains a sufficiently low partial pressure of Vapor B on the permeate side of the membrane to provide a chemical potential gradient of Vapor B across the membrane. Principally Vapor B, and some Vapor A, are transported to the permeate side of the membrane to form a vapor-phase permeate.

Key to the development of a low-cost, efficient vapor-permeation process is the method used to maintain a low partial pressure of Vapor B on the permeate side of the membrane. The prior art describes the application of a vacuum to the permeate side of the membrane, reducing the total pressure of the permeate, thereby reducing the partial pressure of Vapor B on the membrane's permeate side. However, in many instances the cost and complexity of a vacuum system makes this impractical. Furthermore, vacuum-driven systems often leak, allowing air to enter the system. For many separations, especially those with oxygen-sensitive compounds or highly flammable compounds, the presence of oxygen is undesirable or dangerous. Thus, alternative methods are desirable.

U.S. Pat. No. 4,978,430 discloses a vapor permeation process for dehydrating and concentrating an aqueous solution containing an organic compound, whereby the permeate is kept under reduced pressure or a "dry inert gas" can be used to reduce the partial pressure.

U.S. Pat. No. 5,226,932 discloses a membrane process for drying noncondensable gases such as air, nitrogen, carbon dioxide or ammonia that uses low vacuum levels and a dry countercurrent sweep gas on the permeate side of the membrane. Commonly-owned U.S. Pat. No. 5,108,464 also discloses a membrane process for drying noncondensable gases such as air, lower hydrocarbons and acid gases using a countercurrent sweep gas, wherein the sweep gas may be introduced to the permeate side of a hollow fiber membrane module at the retentate end, such that it mixes with the permeate as it passes along the membrane and then exits at the feed end of the module.

U.S. Pat. No. 5,034,025 discloses a membrane process for drying water vapor-containing noncondensable gases such as air, carbon dioxide or natural gas that includes maintaining a water vapor partial pressure differential across the membrane, contacting the lower pressure and permeate side of the membrane with a dry organic condensable sweep gas that is immiscible with water, preferably in a countercurrent flow mode, collecting and condensing the sweep gas containing permeated water, thereby forming a two-phase organic-aqueous liquid condensate, then separating the organic and aqueous phases.

As is apparent from the foregoing, the prior art has suggested the use of a countercurrent gaseous sweep stream on the permeate side of the separation membrane. However, no guidelines have been suggested as to what properties this sweep gas should have. It has been discovered that, in order for the use of a counter-current gaseous sweep stream on the permeate side to be practical, it must have a low concentration or a low partial pressure of Vapor B on the permeate side of the membrane. Furthermore, the method of generating gaseous sweep containing the low concentration of Vapor B must be carefully selected so as to maintain a high-performance, efficient, low-cost system.

Many industries, most notably the semiconductor and microelectronics industries, are relying more and more on the use of ultrapure solvents for various drying, cleaning and manufacturing processes. Typically, the yield from these processes is highly dependent on the purity of the solvent used. Contaminants that are common for many of these solvents include water, trace metals, anions and particulates.

SUMMARY OF THE INVENTION

The present invention comprises a particular application of a vapor permeation process for the selective removal of water vapor from a contaminated solvent feed stream wherein the contaminants comprise, in addition to water, trace metals in ionic form, other ionic species and particulates. The multi-step process comprises:

(a) vaporizing at least a portion of the contaminated organic solvent to produce
  (i) a vaporous feed stream comprising a mixture of solvent vapor, water vapor, ionic species and particulates, and
  (ii) a non-vaporous liquid effluent stream comprising a mixture of liquid solvent, liquid water, ionic species and particulates;

(b) directing the non-vaporous liquid effluent stream to means for further treatment, recycle or discharge.

(c) removing water vapor from the vaporous feed stream by a vapor permeation process to produce a water vapor-depleted vaporous feed stream, the vapor permeation process comprising the steps:
  (i) providing a membrane having a feed side and a permeate side that is selectively permeable to water vapor;
  (ii) directing the vaporous feed stream to the feed side of the membrane while withdrawing a retentate stream depleted in water vapor and withdrawing a permeate stream enriched in water vapor from the permeate side of the membrane; and
  (iii) directing a gas phase fluid sweep stream to the permeate side of the membrane, the sweep stream flowing countercurrent to the flow of the vaporous feed stream, wherein the partial pressure of water vapor in the sweep stream is sufficiently low that the ratio of the partial pressure of water vapor in the sweep stream to the partial pressure of water vapor in the retentate stream is less than 0.9;

(d) condensing the water vapor-depleted vaporous feed stream to produce a dehydrated liquid feed stream;

(e) removing particulates from the dehydrated liquid feed stream by filtration; and (f) directing the dehydrated liquid feed stream to ion-exchange contact means to produce a dehydrated, ionic species-depleted liquid feed stream.

Particulates are removed by conventional absolute filters of the types used to filter out particles greater than 0.1 or 0.2 micron in diameter.

Metal ions and other ionic species are removed by contacting the liquid feed stream with ion exchange media that is compatible with the solvent being purified and that is capable of removing the ionic species of interest.

A closely related aspect of the invention is the method used to generate the sweep stream. The invention includes methods selected from membrane separation, sorption, condensation, bottled purified gases, and gas produced by evaporation of a liquified gas.

Another closely related aspect of the invention is the use of a water vapor removal process on the permeate stream that is selected from condensation, sorption, and a membrane separation. The water vapor removal process can also be used to produce a depleted gas phase stream that can be recycled back to the vapor permeation process, being introduced as sweep gas in step (c)(3).

DETAILED DESCRIPTION OF THE INVENTION

For purposes of the present invention, the following definitions are used.

Solvent: a volatile organic compound having a boiling point greater than –100° C. and less than 200° C. at one atmosphere of pressure.

Vapors: fluids in vaporous form below their critical temperatures and having a boiling point of greater than –100° C. at one atmosphere of pressure.

Sweep: a gas phase fluid, i.e., not a liquid at operating conditions of the process.

Vapor B-rich permeate: the partial pressure of Vapor B in the permeate stream divided by the sum of the partial pressure of Vapor B and the partial pressure of Vapor A in the permeate stream is greater than the same ratio in the feed stream. This term does not necessarily mean that the partial pressure of Vapor B in the permeate is greater than the partial pressure of Vapor B in the feed, since the permeate also contains the gas phase sweep gas.

For illustrative purposes, it is assumed that the feed stream contains two vapors: Vapor A and Vapor B. It is further assumed that the membrane is more permeable to Vapor B than to Vapor A.

Figure 1:
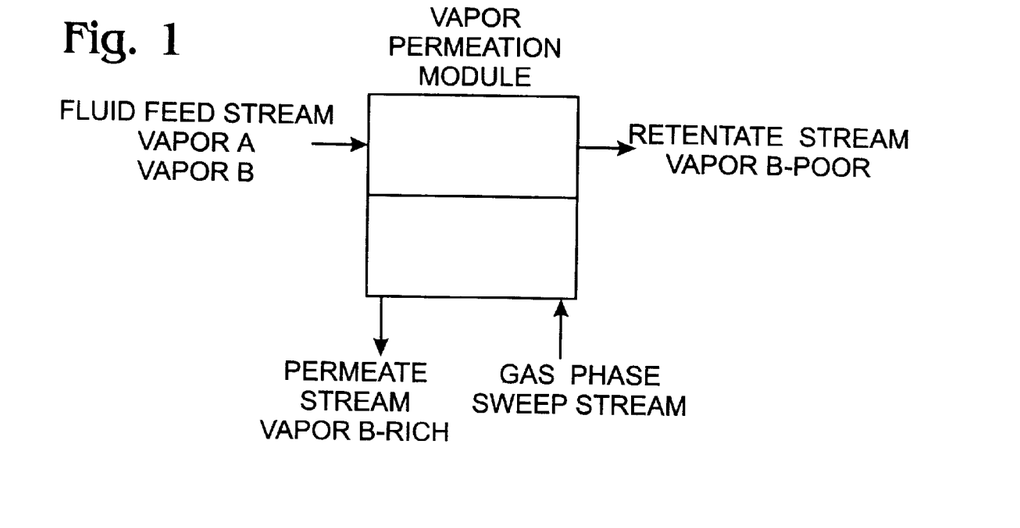
FIGS. 1–10 are schematics showing alternative embodiments of the invention.

FIG. 1 shows the basic process using a membrane to produce a Vapor B-rich permeate stream and a Vapor B-depleted retentate stream, using a countercurrent sweep stream to maintain a low partial pressure of Vapor B on the permeate side of the membrane.

Figure 2:
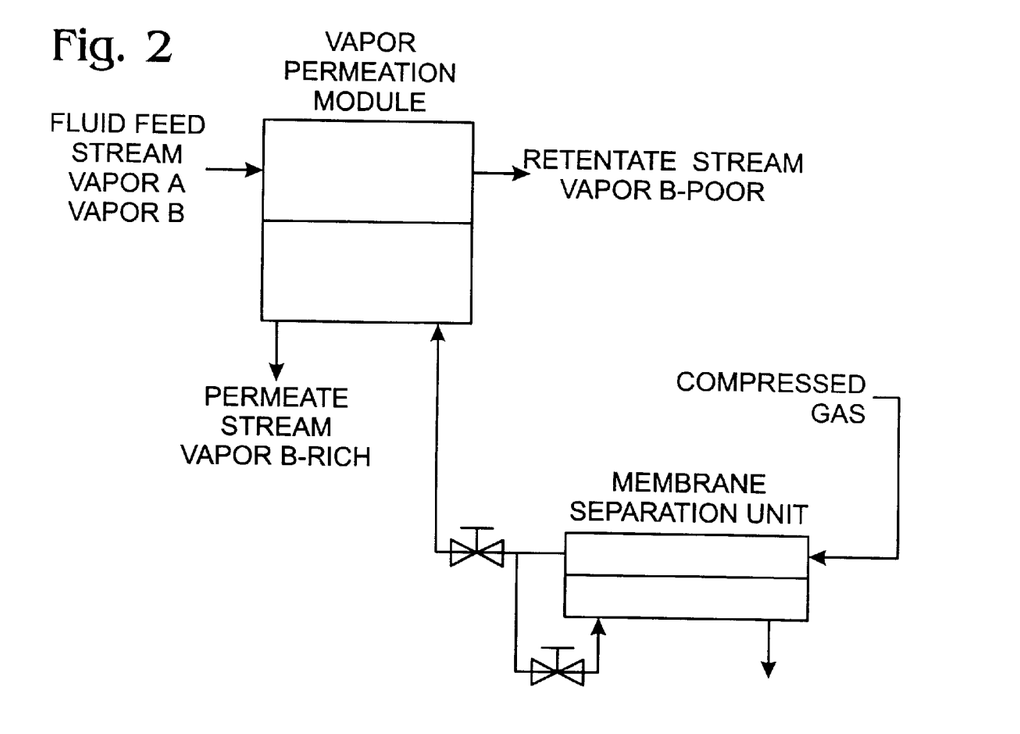

FIG. 2 shows a process similar to that shown in FIG. 1 except that the sweep stream is produced by a membrane-based unit.

Figure 3:
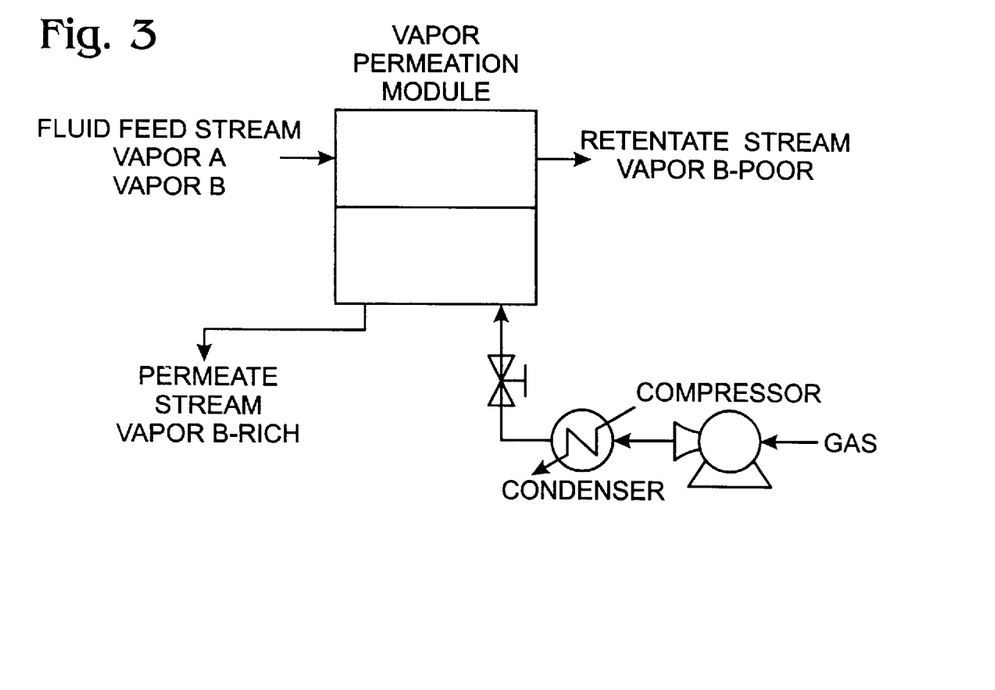

FIG. 3 shows a process similar to that shown in FIG. 1 except that the sweep stream is produced by a hydrid compression/condensation process.

Figure 4:
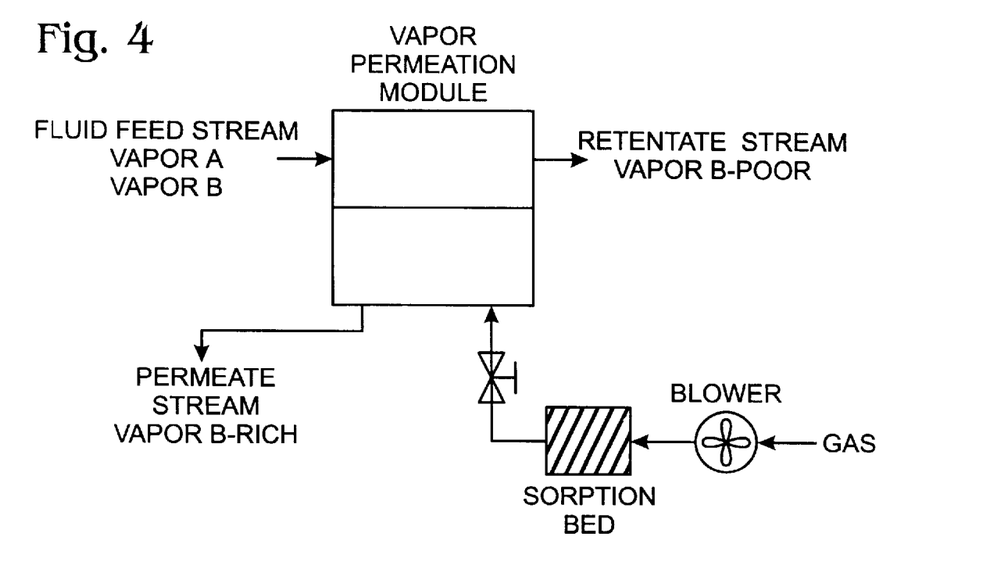

FIG. 4 shows a process similar to that shown in FIG. 1 except that the sweep stream is produced by a sorption process.

Figure 5:
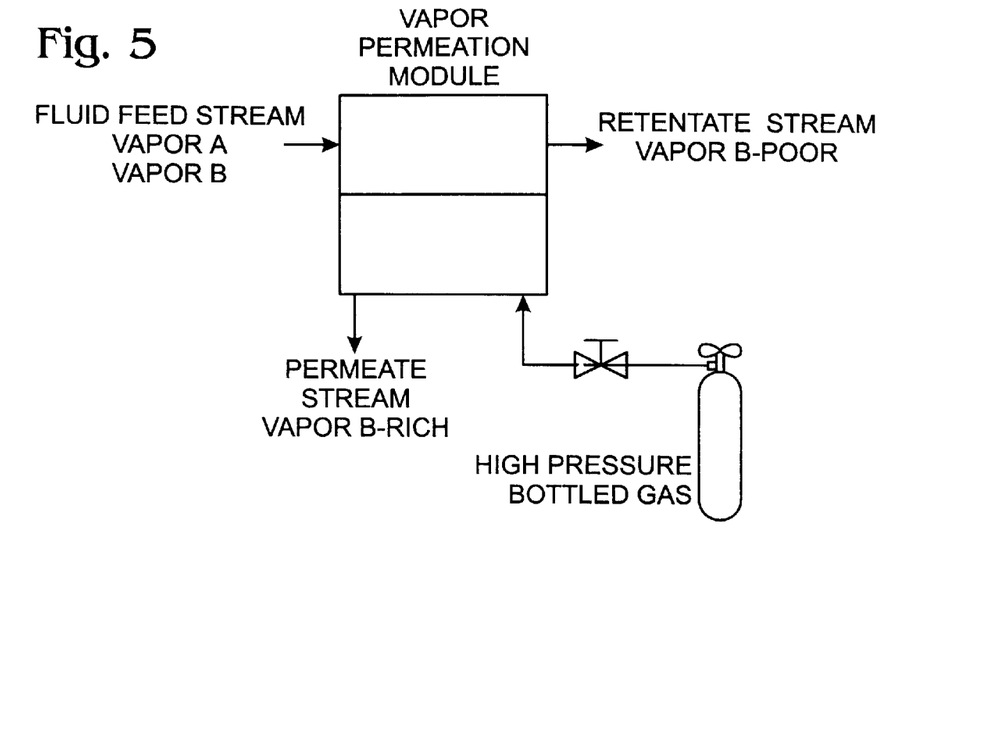

FIG. 5 shows a process similar to that shown in FIG. 1 except that the sweep stream is obtained from bottled purified gas.

Figure 6:
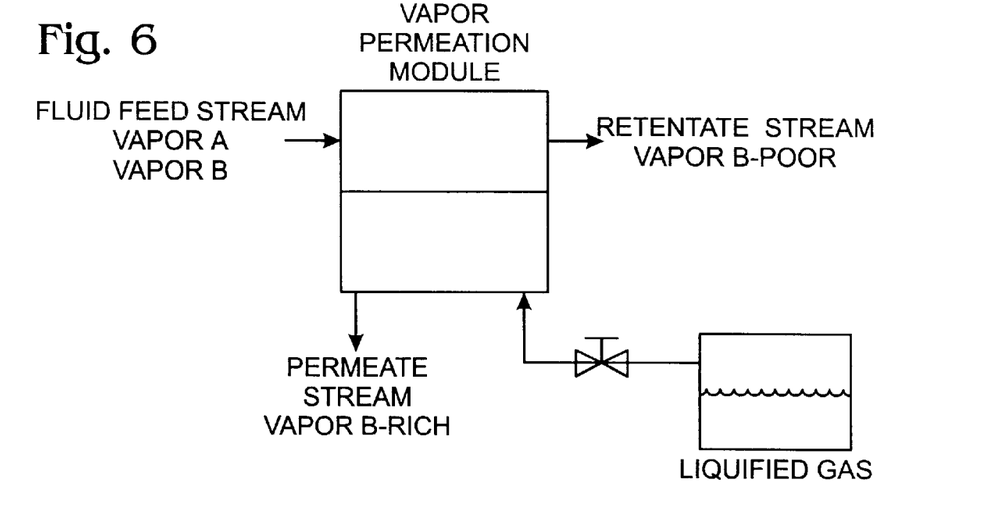

FIG. 6 shows a process similar to that shown in FIG. 1 except that the sweep stream is produced by evaporation of a liquified gas.

Figure 7:
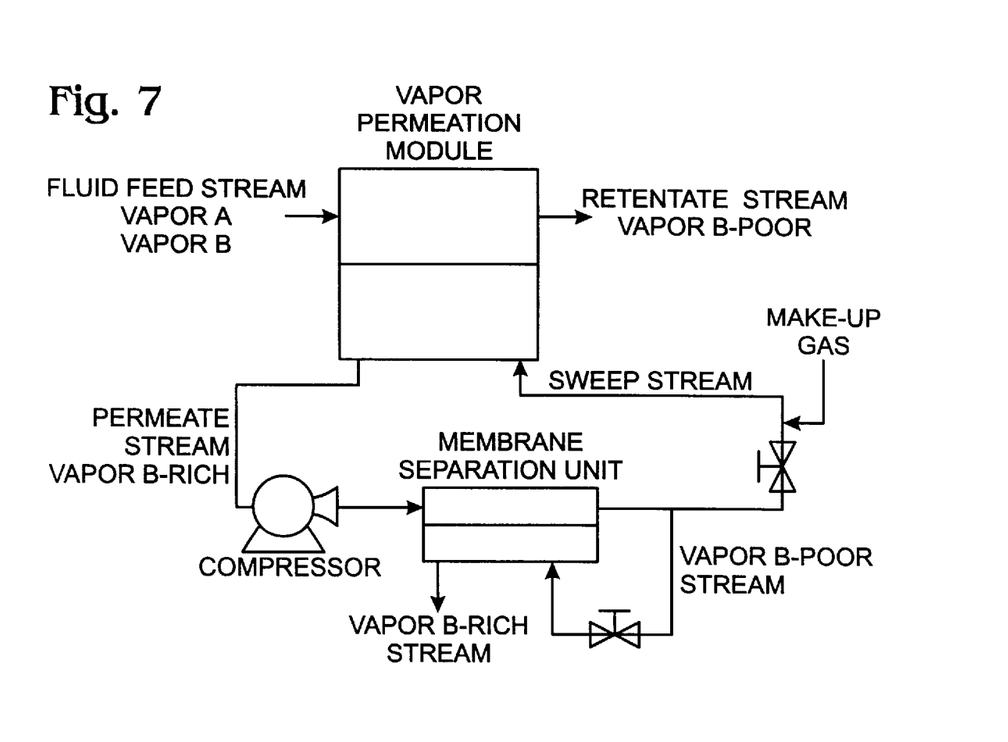

FIG. 7 shows a process similar to that shown in FIG. 1 except that the sweep stream is produced by directing the Vapor B-rich permeate stream to a second membrane-based process, producing a Vapor B-depleted retentate stream that is used as the sweep stream, thereby recycling the gas used for the sweep stream. A makeup gas stream is used to offset any gas losses from the second membrane.

Figure 8:
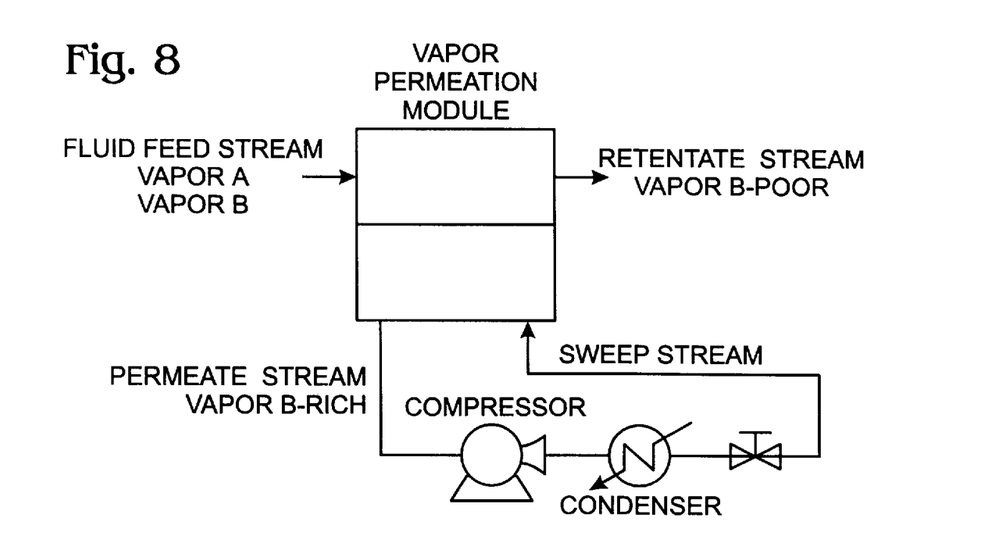

FIG. 8 shows a process similar to that shown in FIG. 1 except that the sweep stream is produced by directing the Vapor B-rich permeate stream to a compression/condensation process, which produces a Vapor B-depleted non-condensable stream that is used as the sweep stream, thereby recycling the gas used for the sweep stream.

Figure 9:
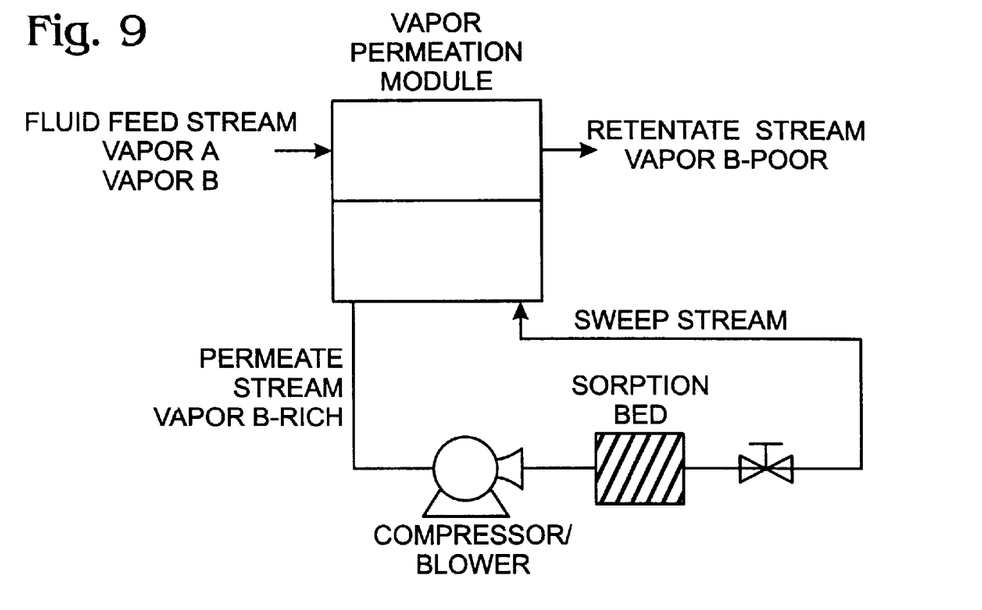

FIG. 9 shows a process similar to that shown in FIG. 1 except that the sweep stream is produced by directing the Vapor B-rich permeate stream to a sorption process, which produces a Vapor B-depleted stream that is used as the sweep stream, thereby recycling the gas used for the sweep stream.

Figure 10:
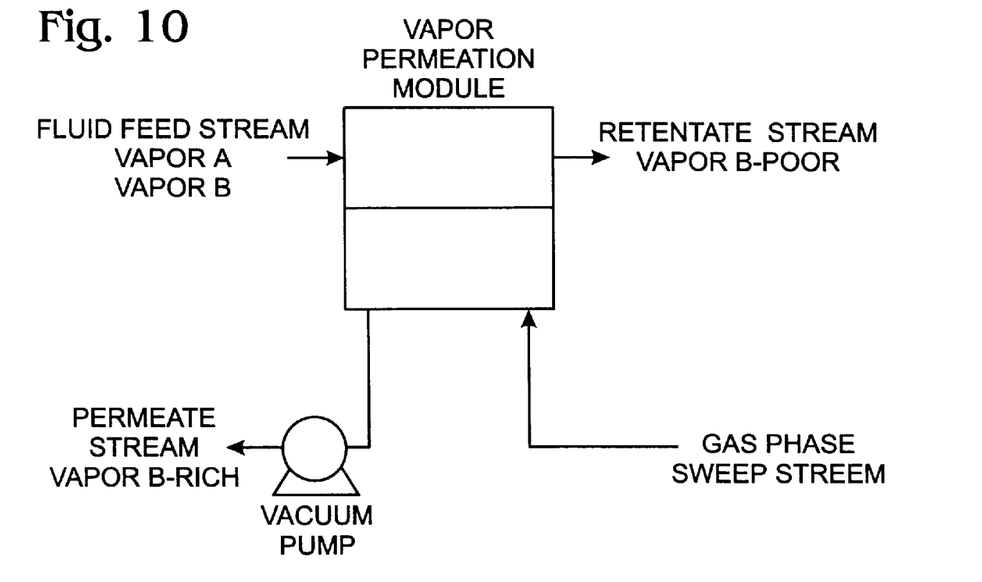

FIG. 10 shows a process similar to that shown in FIG. 1 except that the sweep stream is a gas and a vacuum pump is used on the vapor B-rich permeate stream to enhance efficiency.

It has been discovered that for the use of a countercurrent sweep stream to be effective in vapor removal, the ratio of the partial pressure of the more permeable vapor in the sweep to that of the same component in the retentate must be less than 0.9, preferably less than 0.5. If this partial pressure ratio is greater than 0.9, the driving force for transport of the vapor from the feed side of the membrane to the permeate/sweep stream becomes unacceptably low, which in turn leads to low feed-flow rates to achieve a given level of purity of the retentate stream. Low feed-flow rates mean higher system costs due to the increased membrane area required to treat a given feed-flow rate. However, when the permeate's partial pressure ratio is less than 0.9, the driving force is sufficiently high to permit reasonable feed-flow rates to be used to obtain acceptably high retentate purity, leading to efficient, low-cost systems.

The temperature of the feed should be greater than its condensation temperature at one atmosphere, which in turn should be greater than ambient temperature, and most preferably greater than 40° C., while the total feed pressure should be greater than ambient pressure, and preferably less than 10 atm.

The separation to be achieved by the vapor permeation process of the present invention is most preferably the removal of water vapor from organic vapors, but may also be applied to the removal of volatile compounds from water, or the separation of organic and inorganic vapor mixtures. Generally, the membrane used is selected so that the minor component of the feed stream is selectively removed by the membrane; however, the invention need not be so limited.

The volumetric flow of the sweep stream at the sweep inlet port may be adjusted to provide the desired efficiency. Preferably, the volumetric flow of the sweep stream is sufficient to reduce the partial pressure of the more permeable component on the permeate side of the membrane at the retentate end of the module to below about 90% or less than the value on the feed side of the membrane at the retentate end of the module. The amount of sweep used will therefore depend on the operating conditions and desired concentration of the more permeable component in the retentate stream. Generally, the volumetric flow of the sweep stream should be at least 0.5% of the volumetric flow of the combined permeate-side mixture. In cases where the desired concentration in the retentate stream is very low and the membrane selectivity is high, the volumetric flow of the sweep stream can be 99% or more of the volumetric flow of the combined permeate-side mixture.

The sweep stream used may be any gas that contains a low concentration of the vapor to be removed from the feed stream. For example, in applications where the inert gas nitrogen is used to blanket a flammable solvent, the nitrogen can be used as the sweep stream. Other examples of fluids that can be used as the sweep stream include the inert gases argon and helium; hydrogen; air; carbon dioxide; and carbon monoxide.

The vaporous mixture comprising the feed stream to the membrane selected for the vapor permeation process may derive from a variety of sources including, but not limited to, industrial process vent streams, the vaporous overhead from a distillation process, the overhead from a reflux process, vaporized liquids from industrial processes, vaporized industrial process vent streams, chemical process liquids, the production of fine chemicals, production of pharmaceuticals, the recovery or purification of flavors and fragrances from natural products, and fermentation processes.

The vapors that comprise the vaporous feed mixture can be virtually any compounds with sufficient volatility to be present in the vapor phase, but in the context of the present invention, are preferably contaminated organic solvents. Generally, this includes compounds with boiling points that are less than about 200° C. at one atmosphere, preferably greater than ambient but less than 180° C., and most preferably greater than 40° C. but less than 150° C.

Examples of other compounds that can be removed from the vaporous feed mixture include, but are not limited to, chlorofluorocarbons such as freons and Halons; chlorinated hydrocarbons, such as methylene chloride, trichloroethylene, trichloroethanes, carbon tetrachloride, and chlorobenzene; nonchlorinated hydrophobic organics, such as benzene, toluene, xylene, ethyl benzene, cyclohexane, hexane, and octane; nonchlorinated hydrophilic organics, such as methanol, ethanol, isopropyl alcohol, and other alcohols; acetone, ethyl acetate, methyl ethyl ketone, methyl t-butyl ketone, and other ketones; nitrobenzene; phenols and cresols; formic acid, acetic acid, and other organic acids; amines, including triethylamine and pyridine; acetonitrile; dimethyl formamide, dimethylacetamide, and N-methylpyrrolidinone; and volatile inorganic compounds such as ammonia, bromine, iodine, sulfur dioxide, and thionyl chloride.

The types of membranes suitable for use in the present invention may be broadly described as separation membranes that are used for their selectively permeable nature, and more specifically those which are relatively permeable to one vapor relative to other vapors in the feed stream, and which are "non-reactive" with the vapors of interest in the sense of not contributing to or causing any chemical reaction or conversion of the vapor desired to be removed. The membrane can be made entirely of the permselective material or the permselective material may be supported on a porous membrane, fabric or screen. Examples of such permselective materials useful for such separations include, but are not limited to, hydrophilic materials, including polyvinyl alcohol, cellulosic materials, chitin and derivatives thereof; polyurethanes, polyamides, polyamines, poly(acrylic acids), poly(acrylates), poly(vinyl acetates), and polyethers; hydrophobic materials such as natural rubber, nitrile rubber, polystyrene-butadiene copolymers, poly(butadieneacrylonitrile) rubber; polyurethanes; polyamides; polyacetylenes; poly(trimethylsilylpropyne); fluoroelastomers; poly(vinylchlorides); poly(phosphazenes), particularly those with organic substituents; halogenated polymers, such as poly(vinylidene fluoride) and poly(tetrafluoroethylene); and polysiloxanes, including silicone rubber. Ion-exchange membranes may also be used for some applications. Blends, copolymers, and crosslinked versions of these materials are also useful. Crosslinking of polymers is preferred in most cases to provide sufficient resistance to swelling or dissolution by components of the feed stream.

The membrane may be isotropic or asymmetric. Additionally, the membrane may be homogeneous or a multi-layer composite. In most cases, it is preferred that the membrane material be crosslinked to provide sufficient resistance to swelling or dissolution by the components in the feed stream. The membrane may be made by a solvent phase-inversion process, thermally induced phase-inversion process, melt-extrusion process, or by a wet or dry solvent-casting process. In the case of multilayer composites, the selective layer can be formed by dip-coating, painting, spray-coating, solution-coating, or by interfacial polymerization.

In multilayer composites, the support layers that provide mechanical strength to the composite (as opposed to the permselective layer) should give as little resistance to the transport of the permeating species through the selective layer as is technically feasible. Additionally, the support membrane should be chemically and thermally resistant, allowing for operation on hot feed streams containing various chemical constituents. Materials suitable for the support membrane include, but are not limited to, organic polymers such as polypropylene, polyacrylonitrile, poly(vinylidenefluorides), poly(etherimides), polyimides, polysulfones, poly(ethersulfones), poly(arylsulfones), poly(phenylquinoxalines), polybenzimidazoles, and copolymers and blends of these materials; and inorganic materials such as porous glass, carbon, ceramics, and metals.

The membrane can be used in the form of a flat sheet or hollow fiber or tube. For flat-sheet membranes, the membrane may be placed into a plate-and-frame module designed to permit countercurrent flow of the permeate stream relative to the feed stream. Spiral-wound modules are not suitable inasmuch as they do not allow for countercurrent flow. For hollow fibers and tubes, the feed flow may be on the outside (shell side) or inside (tube side) of the fibers. Especially preferred is a tube-side-feed hollow fiber membrane module. The materials used in the membrane module should have sufficient chemical and thermal resistance to permit long-term operation.

In a preferred embodiment, the membranes suitable for use in the present invention are hydrophilic, crosslinked hollow fibers coated with the permselective coating on the inside or lumens of the fibers.

A wide variety of filters may be used to remove particulates from the feed stream. For most applications, filters with removal ratings of 0.1 to 0.2 $\mu$m are suitable. The filter should be made from materials that are compatible with the solvent being purified. For ultrapure applications, it is also important that the filter material and filter housing not be a source for contamination of the purified solvent. It has been found that materials such as polytetrafluoroethylene (Teflon®), polyfluoroethylene (PFE), and polyethylene (PE) are particularly suitable for ultrapure applications. Examples of suitable filters include the Emflon series of filters manufactured by Pall and the UPE and UPX series of filters manufactured by Millipore.

Virtually any type of ion-exchange media may be used for the ionic species removal step so long as it is compatible with the solvent being purified, i.e., is not chemically degraded by the solvent, and is specific to the removal of the contaminating ionic species. Broad classes of ion-exchange media include anionic and cationic ion-exchange resins. Suitable anionic types are disclosed in U.S. Pat. No. 5,234, 789, the pertinent disclosure of which is incorporated herein and in Samuelson, *Ion Exchange Separations in Analytical Chemistry*, Chapter 2 (John Wiley & Sons, 1963). Exemplary anion-exchange resin types include divinylbenzene-styrene copolymer types, phenolformaldehyde types, acrylic types and epoxy types. Exemplary cation-exchange resins include sulfonic acid types, divinylbenzene-styrene copolymer types, acrylic types, phenolic types and crosslinked polystyrene types, such as disclosed in U.S. Pat. No. 4,136, 021. In addition, ion-exchange resins having both anion and cation exchange groups are suitable for use in the present invention; exemplary mixed ion-exchange resins include IRN from Rohn and Haas and Dowex Monosphere MR-450 UPW from Dow Chemical.

Although virtually any form of contacting means may be used, such as a bed, a slurry or a column, the preferred form of contacting the dehydrated and filtered solvent feed stream is by an ion-exchange column.

The non-vaporous liquid effluent stream will be enriched in contaminants such as ionic species and particulates. This liquid stream can either be discharged from the process as waste, sent to another process for further treatment, or recycled back to the vaporization step. Examples of other processes that could be used for further treatment include ion exchange media for removal of ionic species, and filtration for removal of particulates. After this further treatment, the liquid stream can be recycled back to the vaporization step. If the stream is directly recycled without further treatment, a portion of the recycle stream should be removed as waste so that the concentration of contaminants in the feed stream does not become excessive.

Although the ionic species removal step is preferably conducted after the particulate removal step, it may also be conducted just prior thereto. And in an alternative embodiment, a second ionic species removal step may be utilized by directing the treated stream to a second ion-exchange contactor such as an ion-exchange column.

EXAMPLE 1

Utilizing a system of substantially the same configuration as shown in FIG. 2, a vaporous feed solution comprising 4.8 wt % water in isopropyl alcohol (IPA) at a pressure of 0.1 bar (gage) and a temperature of 95° C. was fed at a rate of 7.8 kg/hr to the lumens of hollow fiber membranes in a module having an effective membrane area of 2.8 m². The inside surfaces of the hollow fibers were coated with a selective layer of a hydrophilic crosslinked polyamide blended with polyvinyl alcohol.

A sweep stream comprising dry air at 95° C. and having a dew point of −29° C. at 6.9 bar (gage) was generated by passing compressed air at 6.9 bar (gage) through an air dehydration module (ADU) manufactured by AquaAir, Inc. of Bend, Oreg. The pressure of this sweep stream was reduced to ambient using a throttle valve and introduced to the permeate side of the membrane at an inlet port located near the retentate end of the module so as to flow substantially countercurrent to the flow of the feed at 280 L (STP)/min.

Under the operating conditions described, the retentate stream had a water partial pressure of 0.00338 bar (absolute), while the sweep stream inlet had a water partial pressure of 0.0005 bar (absolute), so that the ratio of water partial pressure in the sweep stream to water partial pressure in the retentate stream was 0.015. This yielded a retentate stream water concentration of 0.1 wt %, corresponding to a water removal rate of 97.9%.

EXAMPLE 2

Utilizing a system of substantially the same configuration as shown in FIG. 5, a vaporous feed solution comprising 5.9 wt % water in IPA at a pressure of 0.05 bar (gage) and a temperature of 90° C. was fed at a rate of 4.4 kg/hr to the lumens of hollow fiber membranes in a module having an effective membrane area of 2.8 m². The inside surfaces of the hollow fibers were coated with a selective layer of the crosslinked hydrophilic polymer of Example 1.

A sweep stream comprising nitrogen from a gas cylinder at essentially ambient pressure and 90° C. was introduced to the permeate side of the membrane at an inlet port located near the retentate end of the module so as to flow substantially countercurrent to the flow of the feed at 136 L (STP)/min.

Under these operating conditions the retentate stream had a water partial pressure of 0.00048 bar (absolute), while the sweep stream inlet had a water partial pressure of 0.00002 bar (absolute), so that the ratio of water partial pressure in the sweep stream to water partial pressure in the retentate stream was 0.032. This yielded a retentate stream water concentration of 0.01 wt %, corresponding to a water removal rate of 99.8%.

EXAMPLE 3

Utilizing a system of substantially the same configuration as shown in FIG. 10, a vaporous feed solution comprising 7.6 wt % water in IPA at a pressure of 0.3 bar (gage) and a temperature of 91° C. was fed at a rate of 8.5 kg/hr to the lumens of hollow fiber membranes in a module having an effective membrane area of 2.8 m². The inside surfaces of the hollow fibers were coated with a selective layer of the crosslinked hydrophilic polymer of Example 1.

A sweep stream comprising dry air at 91° C. and 0.3 bar (absolute) and a dew point of −30° C. at 6.9 bar (gage) was generated by passing compressed air at 6.9 bar (gage) through the same ADU module used in Example 1. The dry air sweep stream produced by this module was introduced to the permeate side of the membrane at an inlet port located near the retentate end of the module so as to flow substantially countercurrent to the flow of the feed at 127 L (STP)/min. A vacuum pump was used to reduce the pressure of the permeate stream to 0.3 bar (absolute).

Under such conditions, the retentate stream had a water partial pressure of 0.00203 bar (absolute), while the sweep stream inlet had a water partial pressure of 0.00005 bar (absolute), so that the ratio of water partial pressure in the sweep stream to water partial pressure in the retentate stream was 0.024. This yielded a retentate stream water concentration of 0.1 wt %, corresponding to a water removal rate of 99.2%.

EXAMPLE 4

Example 3 was substantially repeated with the following exceptions: the vaporous feed solution contained 9.4 wt % water at a pressure of 0.1 bar (gage) and was fed at a rate of 6.0 kg/hr to the hollow fiber membrane module; the sweep stream was nitrogen from a gas cylinder at 91° C. and 0.3 bar (absolute) flowing at 57 L (STP)/min.

Under these conditions, the retentate stream had a water partial pressure of 0.00008 bar (absolute), while the sweep stream inlet had a water partial pressure of 0.00002 bar (absolute), so that the ratio of water partial pressure in the sweep stream to water partial pressure in the retentate stream was 0.2. This yielded a retentate stream water concentration of 0.002 wt %, corresponding to a water removal rate of 99.9%.

EXAMPLE 5

Utilizing a system of substantially the same configuration as shown in FIG. 10, a vaporous feed solution comprising 3.3 wt % water in ethyl acetate at a pressure of 0.3 bar (gage) and a temperature of 95° C was fed at a rate of 0.14 kg/hr to the lumens of hollow fiber membranes in a module having an effective membrane area of 232 cm$^2$. The inside surfaces of the hollow fibers were coated with a selective layer as in Example 1.

A sweep stream comprising nitrogen from a gas cylinder at 95° C. and 0.3 bar (absolute) was introduced to the permeate side of the membrane at an inlet port located near the retentate end of the module so as to flow substantially countercurrent to the flow of the feed at 0.6 L (STP)/min. A vacuum pump was used to reduce the pressure of the permeate stream to 0.3 bar (absolute).

Under such operating conditions, the retentate stream had a water partial pressure of 0.01524 bar (absolute), while the sweep stream inlet had a water partial pressure of 0.00002 bar (absolute), so that the ratio of water partial pressure in the sweep stream to water partial pressure in the retentate stream was 0.001. This yielded a retentate stream water concentration of 0.1 wt %, corresponding to a water removal rate of 89.9%.

EXAMPLE 6

Utilizing a system of substantially the same configuration as shown in FIG. 10, a vaporous feed solution comprising 12.2 wt % water in ethanol at a pressure of 0.2 bar (gage) and a temperature of 91° C. was fed at a rate of 0.07 kg/hr to the lumens of hollow fiber membranes in a module having an effective membrane area of 232 cm$^2$. The inside surfaces of the hollow fibers were coated with a selective layer as in Example 1.

A sweep stream comprising nitrogen from a gas cylinder at 91° C. and 0.3 bar (absolute) was introduced to the permeate side of the membrane at an inlet port located near the retentate end of the module so as to flow substantially countercurrent to the flow of the feed at 0.6 L (STP)/min. A vacuum pump was used to reduce the pressure of the permeate stream to 0.3 bar (absolute).

Under the operating conditions described, the retentate stream had a water partial pressure of 0.00460 bar (absolute), while the sweep stream inlet had a water partial pressure of 0.00002 bar (absolute), so that the ratio of water partial pressure in the sweep stream to water partial pressure in the retentate stream was 0.003. This yielded a retentate stream water concentration of 0.2 wt %, corresponding to a water removal rate of 98.7%.

EXAMPLE 7

Utilizing a system of substantially the same configuration as shown in FIG. 10, a vaporous feed solution comprising 7.5 wt % water in tetrahydrofuran at a pressure of 0.1 bar (gage) and a temperature of 80° C. was fed at a rate of 1.8 kg/hr to the lumens of hollow fiber membranes in a module having an effective membrane area of 1.4 m$^2$. The inside surfaces of the hollow fibers were coated with a selective layer as in Example 1.

A sweep stream comprising nitrogen from a gas cylinder at 80° C. and 0.3 bar (absolute) was introduced to the permeate side of the membrane at an inlet port located near the retentate end of the module so as to flow substantially countercurrent to the flow of the feed at 85 L (STP)/min. A vacuum pump was used to reduce the pressure of the permeate stream to 0.3 bar (absolute).

Under the operating conditions described, the retentate stream had a water partial pressure of 0.00686 bar (absolute), while the sweep stream inlet had a water partial pressure of 0.00002 bar (absolute), so that the ratio of water partial pressure in the sweep stream to water partial pressure in the retentate stream was 0.002. This yielded a retentate stream water concentration of 0.01 wt %, corresponding to a water removal rate of 99.9%.

EXAMPLE 8

Example 3 was substantially repeated with the following exceptions: the vaporous feed solution contained 12.7 wt % water at a pressure of 0.1 bar (gage) and a temperature of 95° C.; the sweep stream was nitrogen from a gas cylinder at 95° C. and 0.3 bar (absolute) and flowed at 57 L (STP)/min.

Under such operating conditions, the retentate stream had a water partial pressure of 0.00047 bar (absolute), while the sweep stream inlet had a water partial pressure of 0.00002 bar (absolute), so that the ratio of water partial pressure in the sweep stream to water partial pressure in the retentate stream was 0.032. This yielded a retentate stream water concentration of 0.014 wt %, corresponding to a water removal rate of 99.9%.

COMPARATIVE EXAMPLE 1

For comparison, the system and module described in Example 8 were operated under identical operating conditions with countercurrent permeate flow but with the nitrogen sweep flow set to zero so that no nitrogen was introduced as a sweep gas to the membrane module. Under these conditions, the retentate stream had a water concentration of 5.2 wt %, corresponding to a water removal rate of only 60%.

EXAMPLE 9

A computerized mathematical model of the system shown in FIG. 8 was prepared and utilized to predict the performance of the system utilizing various parameters. A vaporous feed solution comprising 18 wt % water in IPA at a pressure of 0.1 bar (gage) and a temperature of 95° C. is fed at a rate of 8.9 kg/hr to the lumens of hollow fiber membrane in a module having an effective membrane area of 2.8 m$^2$, the inside surfaces of the hollow fibers of which are coated with the same type of selective layer as used in previous Examples.

A sweep stream of nitrogen at 95° C. and at essentially ambient pressure and having a water vapor partial pressure of 0.0007 bar (absolute) is introduced to the permeate side of the membrane at an inlet port located near the retentate end of the module so as to flow substantially countercurrent to the flow of the feed at 516 L (STP)/min.

Under these conditions, the permeate exiting the module has a calculated water vapor partial pressure of 0.047 bar (absolute). This stream is fed to a compressor, where the pressure is increased to 6.9 bar (gage). The resulting high pressure stream is sent to a condenser operating at a temperature of 0° C., where the water vapor is condensed. The non-condensable stream exiting the condenser is reduced to essentially ambient pressure using a throttle valve. The resulting ambient pressure stream is assumed to have a water vapor partial pressure of 0.0005 bar (absolute). The stream is then heated to 95° C. and introduced into the module as a countercurrent sweep stream.

Under such operating conditions, the retentate stream has a calculated water concentration of 0.05 wt %, corresponding to a water vapor partial pressure of 0.00014 bar (absolute). Thus, the module has a calculated water removal rate of 99.7% and the ratio of the water vapor partial pressure in the sweep stream to that of the retentate stream is calculated to be 0.36.

EXAMPLE 10

A computerized mathematical model of the system shown in FIG. 7 was prepared and utilized to predict the performance of the system utilizing various parameters. The same vaporous feed solution as in Example 9 is fed in the same manner and at the same rate to the same hypothetical hollow fiber membrane module and using the same sweep stream of Example 9, to produce a permeate exiting the module having a calculated water vapor partial pressure of 0.047 bar (absolute). This stream is fed to a compressor, where the pressure is increased to 6.9 bar (gage). The resulting high pressure stream is calculated to have a dew point temperature (at 6.9 bar (gage)) of 74° C. This stream is then directed to a membrane gas-drying module to reduce the dew point of the gas to 0° C. (at 6.9 bar (gage). The pressure of this stream is then reduced to essentially ambient pressure using a throttle valve and make-up nitrogen from a gas cylinder at a flow rate of 103 L (STP)/min is blended with this stream. The blended stream, which has a calculated water vapor partial pressure of 0.0005 bar (absolute), is then heated to 95° C. and introduced into the module as a sweep stream.

Under such operating conditions, the retentate stream has a calculated water concentration of 0.05 wt %, corresponding to a water vapor partial pressure of 0.00014 bar (absolute). Thus, the module has a water removal rate of 99.7% and the ratio of the water vapor partial pressure in the sweep stream to that of the retentate stream is 0.36.

EXAMPLE 11

A computerized mathematical model of the system shown in FIG. 9 was prepared and utilized to predict the performance of the system utilizing various parameters. The same vaporous feed solution is fed in the same manner and at the same rate to the same module and using the same sweep stream of Example 9, to produce a permeate exiting the module having a calculated water vapor partial pressure of 0.047 bar (absolute). This stream is fed to a compressor, where the pressure is increased to 6.9 bar (gage). The resulting high pressure stream is sent to a desiccant bed where water is removed to a pressure dew point of 0° C. The pressure of the desiccant-dried nitrogen is then reduced to essentially ambient pressure using a throttle valve. The resulting ambient pressure stream has a calculated water vapor partial pressure of 0.0005 bar (absolute). The stream is then heated to 95° C. and introduced into the module as a sweep stream.

Under such operating conditions, the retentate stream had a calculated water concentration of 0.05 wt %, corresponding to a water vapor partial pressure of 0.00014 bar (absolute). Thus, the module has a calculated water removal rate of 99.7% and the ratio of the water vapor partial pressure in the sweep stream to that of the retentate stream is 0.36.

EXAMPLES 12 TO 17

A computerized mathematical model of the system shown in FIG. 10 was prepared and utilized to predict the performance of the system utilizing various parameters. A vaporous feed solution comprising 10 wt % water in IPA at a pressure of 0.1 bar (gage) and a temperature of 95° C. is fed to the lumens of hollow fiber membranes in a module having an effective membrane area of 2.8 $m^2$, the inside surfaces of the hollow fibers of which are coated with the same type of selective layer as in previous Examples. The flow rate of this feed stream was varied as shown in Table 1 and as discussed below.

A sweep stream of nitrogen at 95° C. and at a pressure of 0.2 bar (absolute) and having the various water vapor partial pressures shown in Table 1 is introduced to the permeate side of the membrane at an inlet port located near the retentate end of the module so as to flow substantially countercurrent to the flow of the feed at 57 L (STP)/min.

The flow rate of the vaporous feed solution was varied as shown in Table 1 so that under the specified operating conditions, the retentate stream had a water partial pressure of 0.0039 bar (absolute), corresponding to a retentate stream water concentration of 0.1 wt % water, corresponding to a water removal rate of 99%. The results in Table 1 show that when the ratio of water partial pressure in the sweep stream to water partial pressure in the retentate stream is greater than about 0.9, the feed flow rate to the module must be very low to obtain the desired retentate water concentration, resulting in a high-cost and inefficient system. The reason that the feed flow rate to the module must be very low to obtain the desired retentate water concentration is because when the ratio is greater than 0.9, the partial-pressure driving force for transport of water vapor across the membrane also becomes low. Therefore, to achieve a given retentate water concentration, the flow rate of feed solution to the module must be reduced to allow sufficient time for water to be removed from the feed solution. The reason that a >0.9 ratio results in a high-cost and inefficient system is because when the ratio is greater than 0.9, the feed flow rate to the module must be low compared with when the ratio is less than 0.9. As a result, to treat a given volume of feed solution, more membrane area will be required which is less efficient, and the requirement for more membrane surface area leads to higher membrane costs, and ultimately to a higher-cost system.

TABLE 1

| Example | Water Vapor Partial Pressure (bar [absolute]) | | Ratio of Sweep to Retentate Partial Pressure | Feed Flow Rate (kg/hr) |
|---|---|---|---|---|
| | Sweep | Retentate | | |
| 12 | 0.0013 | 0.0039 | 0.33 | 6.8 |
| 13 | 0.0021 | 0.0039 | 0.55 | 6.4 |
| 14 | 0.0027 | 0.0039 | 0.70 | 6.0 |
| 15 | 0.0036 | 0.0039 | 0.94 | 5.0 |
| 16 | 0.0038 | 0.0039 | 0.97 | 4.6 |
| 17 | 0.0039 | 0.0039 | 1.00 | 4.2 |

EXAMPLE 18

An untreated liquid feed stream of isopropyl alcohol (IPA) having the contaminants shown in Table 2 was fed at a rate of 7.5 kg/hr to a boiler, producing (a) a vaporous feed solution at a rate of 7.4 kg/hr and a pressure of 0.1 bar (gauge) and a temperature of 95° C., and (b) a liquid bleed stream at a rate of 0.1 kg/hr, discharged as waste.

Utilizing a system of substantially the same configuration as shown in FIG. 10, the vaporous feed solution was fed to the lumens of hollow fiber membranes in a module having an effective membrane area of 2.8 m². The inside surfaces of the hollow fibers were coated with a selective layer of a hydrophilic crosslinked polyamide blended with polyvinyl alcohol.

A sweep stream comprising dry nitrogen at 95° C. and having a dew point of less than −30° C. at 6.9 bar (gauge) was reduced to ambient pressure using a throttle valve and introduced to the permeate side of the membrane at an inlet port located near the retentate end of the module so as to flow substantially countercurrent to the flow of the feed at 180 L (STP)/min. A vacuum pump was used to reduce the permeate pressure to 0.3 bar (absolute).

Under the operating conditions described, the retentate stream had the composition shown in Table 2. These data show that the combination of using the boiler and the countercurrent hollow fiber membrane module resulted in a substantial reduction in the concentration of contaminants in the IPA.

The retentate stream was then fed at a rate of 2.4 kg/hr to a 0.2 $\mu$m particulate filter (P-Emflon, Pall Ultrafine Filtration Company, East Hills, N.Y.). The filtered retentate was then passed through a 2.5 cm diameter ion exchange column containing 118 cm³ of DOWEX Monosphere MR-450 UPW mixed ion exchange resin (Dow Chemical, Midland, Mich.), producing a purified effluent stream. As shown in Table 2, the combination of the particulate filter and ion exchange resin produced ultrapure IPA, containing virtually no detectable metal ions or anions. In addition, the number of particles in the stream was greatly reduced.

TABLE 2

| Contaminant | Untreated IPA | Retentate Stream | Purified Effluent Stream |
|---|---|---|---|
| Water (ppm) | 200 | 5 | 5 |
| Metals (ppb) | | | |
| Boron | 0.13 | <0.10 | <0.10 |
| Calcium | 0.45 | <0.10 | <0.10 |
| Chromium | 0.20 | <0.05 | <0.05 |
| Cobalt | 0.033 | <0.01 | <0.01 |
| Copper | 0.10 | <0.05 | <0.05 |
| Iron* | 0.26 | <0.10 | <0.10 |
| Lithium | 0.65 | 0.31 | <0.05 |
| Magnesium | 0.90 | <0.05 | <0.05 |
| Manganese | 0.34 | <0.05 | <0.05 |
| Nickel | 1.0 | 0.083 | <0.05 |
| Potassium | 45 | 10 | <0.10 |
| Sodium | 58 | 12 | <0.10 |
| Zinc | 0.50 | 1.5 | <0.05 |
| Anions (ppb) | | | |
| Chloride | 37 | <2 | <2 |
| Nitrate | 14 | <2 | <2 |
| Particles (Number/mL) | | | |
| ≧0.2 $\mu$m | 9,698 | 2,969 | 36 |
| ≧0.5 $\mu$m | 1,058 | 21 | 2 |
| ≧1.0 $\mu$m | 233 | 3 | 1 |
| ≧2.0 $\mu$m | 30 | 1 | 0 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process for the removal of water, ionic species and particulates from a contaminated organic solvent comprising the steps:

(a) vaporizing at least a portion of said contaminated organic solvent to produce (i) a vaporous feed stream comprising a mixture of solvent vapor, water vapor, ionic species and particulates, and (ii) a non-vaporous liquid effluent stream comprising a mixture of liquid solvent, liquid water, ionic species and particulates;

(b) directing said non-vaporous liquid effluent stream from step (a)(ii) to means for further treatment or discharge;

(c) removing water vapor from said vaporous feed stream from step (a)(i) by a vapor permeation process to produce a water vapor-depleted vaporous feed stream, said vapor permeation process comprising the steps:

(i) providing a membrane having a feed side and a permeate side that is selectively permeable to water vapor;

(ii) directing said vaporous feed stream from step (a)(i) to the feed side of said membrane while withdrawing a retentate stream depleted in water vapor and withdrawing a permeate stream enriched in water vapor from the permeate side of said membrane; and (iii) directing a gas phase sweep stream to the permeate side of said membrane, said sweep stream having an upstream side and a downstream side and flowing countercurrent to the flow of said vaporous feed stream of step (a)(i), wherein the partial pressure of water vapor in said sweep stream is sufficiently low that the ratio of the partial pressure of water vapor in said sweep stream to the partial pressure of water vapor in said retentate stream is less than 0.9;

(d) condensing said water vapor-depleted vaprous feed stream to produce a dehydrated liquid feed stream;

(e) removing particulates from said dehydrated liquid feed stream by filtration; and (f) directing said dehydrated liquid feed stream to ion-exchange contact means to produce a dehydrated, ionic species-depleted liquid feed stream.

2. The process of claim 1 wherein step (f) is performed prior to step (e).

3. The process of claim 2, including subjecting said liquid feed stream to an additional step (f) prior to step (e).

4. The process of claim 1 or 2 or 3 wherein a vacuum is applied to the downstream side of said sweep stream in step (c).

5. The process of claim 1 wherein said means for further treatment of step (b) comprises recycling said non-vaporous liquid effluent stream to step (a).

6. The process of claim 1 wherein said gas phase sweep stream is generated by a process selected from membrane separation, sorption, and condensation.

7. The process of claim 1 wherein said gas phase sweep stream is obtained from bottled, purified gases.

8. The process of claim 1 wherein said gas phase sweep stream is obtained by evaporation of a liquid gas.

9. The process of claim 1, including an additional step (c)(iv) of directing said permeate stream enriched in water vapor to a vapor-removal process.

10. The process of claim 9 wherein said vapor-removal process of step (c)(iv) is selected from condensation, sorption, and a membrane separation.

11. The process of claim 9 wherein said vapor-removal process of step (c)(iv) produces a depleted gas-phase stream that is depleted in water vapor, wherein the concentration of water vapor in said depleted gas-phase stream is sufficiently low such that the ratio of the partial pressure of water vapor in said depleted gas phase stream to the partial pressure of water vapor in said retentate stream is less than 0.9.

12. The process of claim 11 wherein said depleted gas phase stream is used as the sweep stream in step (c)(iii), thereby recycling said gas phase sweep stream.

13. The process of claim 1 wherein said membrane is a hollow fiber composite membrane.

14. The process of claim 1 wherein said contaminated organic solvent is an organic compound having a boiling point greater than −100° C. at one atmosphere of pressure.

15. The process of claim 14 wherein said solvent is selected from the group consisting of acetone, isopropyl alcohol, methanol, ethanol, ethyl acetate, methyl ethyl ketone and tetrahydrofuran.

16. The process of claim 1 wherein said vaporous feed stream in step (c) has a condensation temperature of greater than 40° C. at 1 atmosphere of pressure.

17. The process of claim 16 wherein the temperature of said vaporous feed stream is maintained at a temperature that is greater than or equal to the condensation temperature of the vaporous feed stream at 1 atmosphere of pressure.

18. The process of claim 1 wherein said vaporous feed stream is maintained at a pressure of greater than 0 bar (gage) but less than 10 bar (gage).

19. The process of claim 18 wherein said pressure is less than 4 bar (gage).

* * * * *